US006782298B2

United States Patent
Soto et al.

(10) Patent No.: US 6,782,298 B2
(45) Date of Patent: Aug. 24, 2004

(54) ELECTRONICS FOR A SHOCK HARDENED DATA RECORDER

(75) Inventors: Gabriel H. Soto, Ridgecrest, CA (US); Michael D. Haddon, Ridgecrest, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/391,178

(22) Filed: Mar. 17, 2003

(65) Prior Publication Data

US 2003/0223317 A1 Dec. 4, 2003

Related U.S. Application Data

(62) Division of application No. 09/585,730, filed on Jun. 2, 2000, now Pat. No. 6,560,494.

(51) Int. Cl.⁷ .............................................. G05B 21/02
(52) U.S. Cl. ........................... 700/73; 700/79; 701/14; 702/187; 361/92; 361/111; 346/38
(58) Field of Search ...................... 700/73, 79; 701/14; 702/187; 361/92, 111; 346/38

(56) References Cited

U.S. PATENT DOCUMENTS 4,729,102 A * 3/1988 Miller et al. ................... 701/14
5,600,576 A * 2/1997 Broadwater et al. ........ 702/187
5,724,553 A * 3/1998 Shigeeda ..................... 711/170

* cited by examiner

Primary Examiner—Anthony Knight
Assistant Examiner—Thomas Pham
(74) Attorney, Agent, or Firm—Laura R. Foster

(57) ABSTRACT

Electronics for a shock-hardened device, in particular a data recorder, incorporating non-volatile memory. The device has the functional elements: a signal conditioning circuit, an oscillator, an analog-to-digital converter (ADC), a field programmable gate array (FPGA), a trigger, and a non-volatile memory incorporating both electrically erasable programmable read only memory (EEPROM) and fast static random access memory (SRAM). As a recorder, the electronics enable efficient and reliable data recording in extreme shock environments, e.g., those involving dynamic testing of weapons such as target penetrating bombs or dual-stage warheads. It also provides for data retention upon loss or shutdown of power to the unit and yields high MTBF (mean time between failure) figures in more benign environments.

5 Claims, 2 Drawing Sheets

ELECTRONICS FOR A SHOCK HARDENED DATA RECORDER

CROSS REFERENCE TO RELATED APPLICATIONS

This application is being filed as a Divisional Application in accordance with 37 C.F.R. 1.53(b). The Parent Application of this Divisional Application is application Ser. No. 09/585,730 filed Jun. 2, 2000 now U.S. Pat. No. 6,560,494.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

An electrical device, in particular a data recorder incorporating non-volatile memory, that survives and operates during the effects of physical shocks.

BACKGROUND

Recording data from tests of ordnance systems employed in a high shock environment, such as target penetrators, dual-stage warheads, etc., presents significant practical problems in acquisition and retention of test data. Possible conventional solutions include:

a. Telemetry through direct instrumentation, i.e., wiring directly to the device under test. Constraints of this method are that the system under test must be stationary and that the instrumentation cabling must be capable of surviving a high shock environment.

b. Data transceivers using radio or telemetry techniques to transmit environmental data. Constraints of this method are that the transceivers are not available as sufficiently shock-hardened units for high shock environments and require a large volume within the test setup.

c. Shock-hardened solid-state data recorders incorporating volatile memory or battery backup. The constraint is that reliability is compromised by power outages or failure of batteries, or both, during and immediately after the test.

One solution involves shock hardening solid-state digital data recorders incorporating non-volatile memories, such as an embodiment of the present invention.

SUMMARY OF THE INVENTION

The shock-hardened data recorder of a preferred embodiment of the present invention has five functional elements:

a. a signal conditioning circuit,
b. an oscillator,
c. a 16-bit analog-to-digital converter (ADC),
d. a field programmable gate array (FPGA), and
e. a non-volatile memory.

The signal conditioning circuit incorporates a fixed-output voltage regulator to supply the remaining functional elements. The output is filtered by two capacitors, one on the input side of the regulator and the other on the output side. A surge-suppressing diode eliminates voltage spikes on the output of the supply source.

The oscillator is a shock-hardened oscillator. It supplies a clock signal for use by the FPGA.

The 16-bit ADC converts the incoming analog signal into binary.

The FPGA provides timing and control between the ADC and the non-volatile memory.

The non-volatile reprogrammable memory incorporates both a fast, static random access memory (SRAM) and electrically erasable programmable read only memory (EEPROM). Data within the SRAM is written to the EEPROM either on command or automatically during power down. The SRAM contains a voltage-sensing element that detects when the power supply has dropped below a minimum threshold. Upon breaching this minimum, the SRAM initiates a "store" command. A capacitor from the signal conditioning circuit provides the necessary power to write the contents of the SRAM to the EEPROM during power down. Data stored in the EEPROM is automatically recalled during power up.

At power up, the FPGA determines its status, i.e., its current mode of operation, by interrogation of the trigger input. In "memory read" mode, the FPGA reads the data stored in the non-volatile memory (EEPROM) and forwards the data in a serial bit stream. A logic circuit then outputs the serial bit stream as 16-bit words that represent the original analog signal.

In "memory write" mode, the FPGA enables the ADC and waits for a trigger line to change states. Once the trigger is detected, the ADC is commanded to convert the analog signal into a digital word, nominally 16 bits. The 16-bit word is clocked out of the ADC sequentially as two 8-bit bytes. The most significant byte is loaded into the FPGA first. The most significant byte and memory address are sent to a first memory chip for storage. The least significant byte is loaded next. The least significant byte and memory address are sent to a second memory chip for storage. Thus, one chip retains the most significant byte and the other the least significant byte. The memory address is incremented, and the process is repeated until memory is full. The benefit of this setup is that only four wires need be used to store and retrieve data from the recorder: ground, power, trigger, and serial data out. This significantly reduces the physical protection required and, in turn, facilitates the shock hardening of the recorder.

Advantages of preferred embodiments of the present invention include:

reduced power requirements;
simpler components;
no moving parts;
high reliability due to controlled shutdown should power fail;
reduced system capital costs by eliminating separate power source/batteries;
reduced testing cost by reducing the need to repeat testing where data is lost;
increased operational readiness;
reduced maintenance costs of a simpler design;
high durability;
easy upgrade; and
ready application to existing instrumentation systems.

Embodiments of the present invention also can be applied to test environments with few environmental constraints, resulting in very low mean time between failure (MTBF) rates. Preferred embodiments are fully disclosed below, albeit without placing limitations thereon.

DETAILED DESCRIPTION

Figure 1:
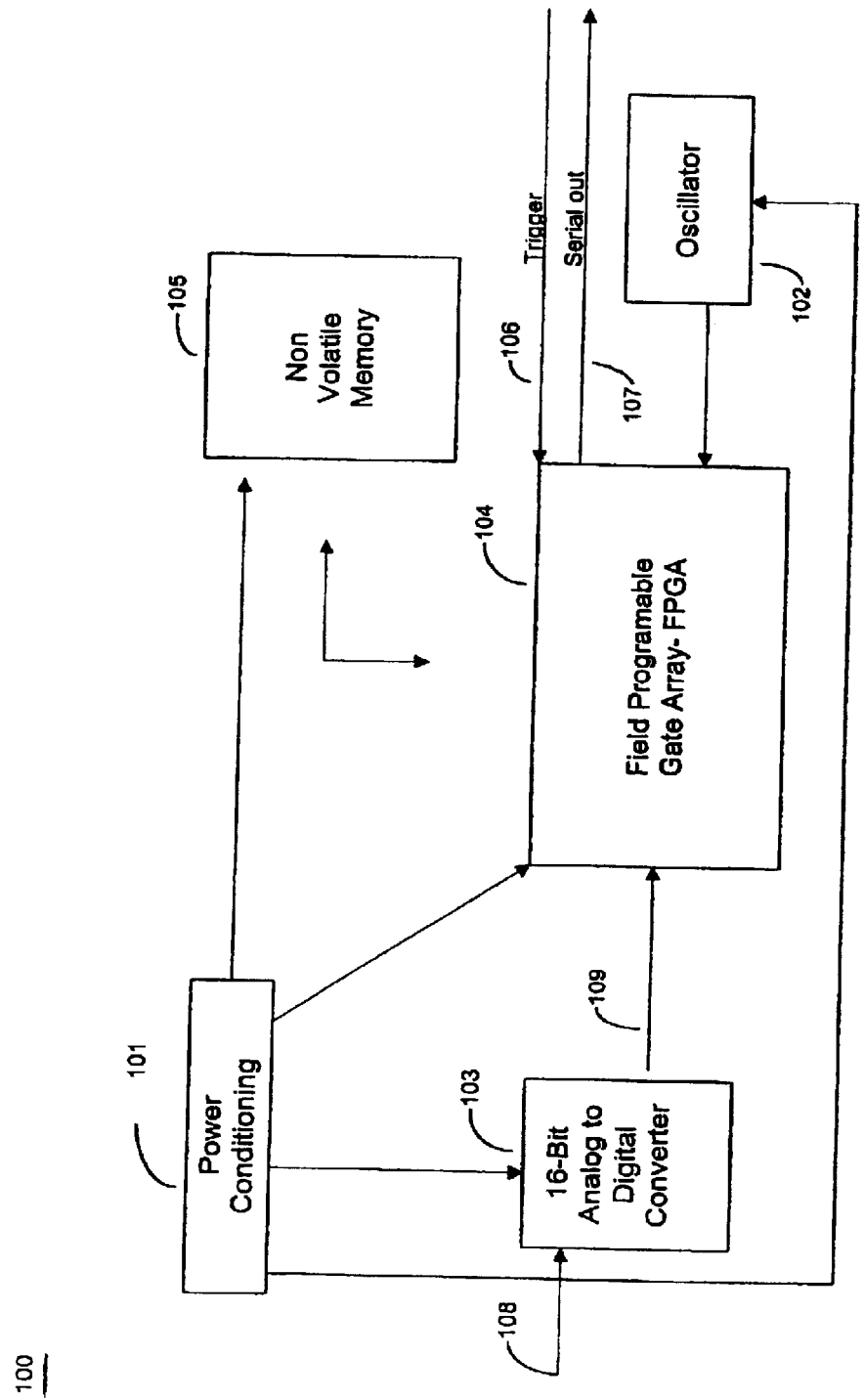
FIG. 1 is a block diagram of a preferred embodiment of the present invention.

Refer to FIG. 1. The diagram depicts major electronic components of a preferred embodiment of a shock-hardened recorder 100 for use in dynamic testing of ordnance (not separately shown), such as target penetrators and dual-stage warheads.

The shock-hardened data recorder 100 has five functional components:

a. a signal conditioning circuit 101,
 b. an oscillator 102,
 c. an ADC 103, preferably 16-bit,
 d. an FPGA 104, and
 e. a non-volatile memory 105.

Figure 2:
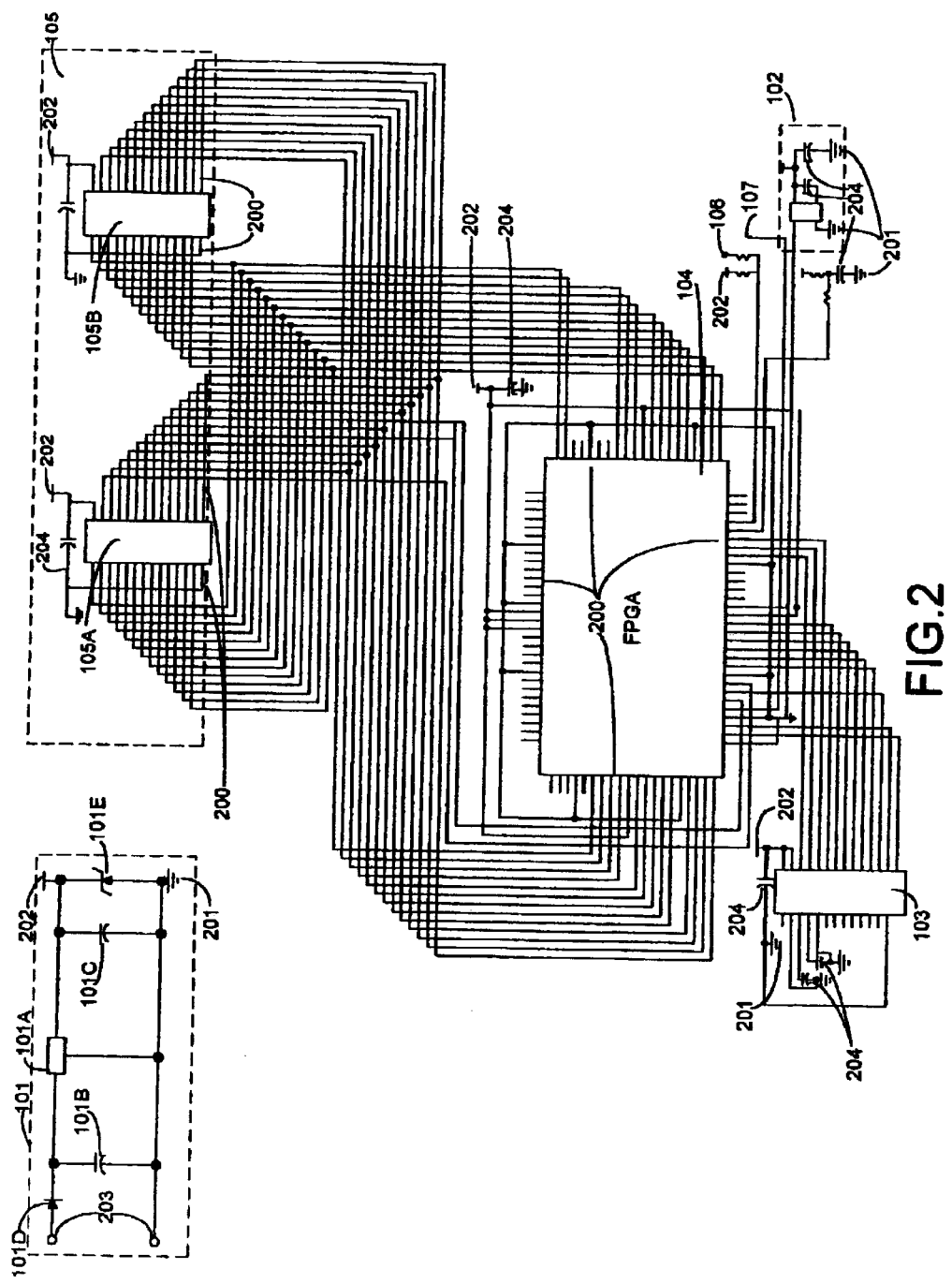
FIG. 2 is a circuit diagram embodying the digital signal paths to the non-volatile memory as well as the connections to the five major components of a preferred embodiment of the present invention.

The signal conditioning circuit 101 incorporates a fixed-output voltage regulator (101 shown in FIG. 2) to supply 5 volts (V) to the remaining four components 102-105. Referring to FIG. 2, the output 202 is filtered by two capacitors 101B and 101C, one on the input side 101B of the regulator 101A and the other on the output side 10C. A surge-suppressing diode 101D eliminates voltage spikes on the output of the 5V supply 203.

The oscillator 102 is a shock-hardened oscillator. It supplies a clock signal for use by the FPGA 104.

The 16-bit ADC 103 converts the incoming analog signal into binary.

The FPGA 104 provides timing and control between the ADC 103 and the non-volatile memory 105.

The reprogrammable non-volatile memory 105 incorporates both a fast SRAM (not separately shown) and an EEPROM (not separately shown). Data within the SRAM is written to the EEPROM, either on command or automatically during power down. The SRAM contains a voltage-sensing element (not separately shown) that detects when the 5V power supply 203 has dropped below a minimum threshold. Upon breaching this minimum, the SRAM initiates a "store" command. A capacitor 101C from the signal conditioning circuit 101 provides the necessary power to write the contents of the SRAM to the EEPROM during power down. Data stored in the EEPROM is automatically recalled during power up.

At power up, the FPGA 104 determines its status, i.e., current operating mode, by interrogation of the trigger input 106. In "memory read" mode, the FPGA 104 reads the data stored in the non-volatile memory (i.e., the EEPROM) 105 and outputs the data as alternating 8-bit bytes in a serial bit stream 107. A logic circuit (not separately shown) then converts that serial bit stream 107 into 16-bit words (not separately shown), output as a digital representation of the original analog input signal 108.

In "memory write" mode, the FPGA 104 enables the ADC 103 and waits for a trigger line 106 to change states. Once the trigger is detected, the ADC 103 is commanded to convert the analog signal 108 into a 16-bit word 109. The 16-bit word 109 is clocked out of the ADC 103 sequentially as two 8-bit bytes (not separately shown). The most significant byte (not separately shown) is loaded into the FPGA 104 first. Referring to FIG. 2, the most significant byte and memory address (not separately shown) are sent to the first memory chip 105A for storage. The least significant byte (not separately shown) is loaded next. The least significant byte and memory address are sent to a second memory chip 105B for storage. Thus, one chip retains the most significant byte and the other the least significant byte. The memory address is incremented, and the process is repeated until memory 105 is full.

FIG. 2 depicts a preferred embodiment of the digital connections necessary to carry out the separation of the most significant byte and the least significant byte for storage in separate memory chips 105A and 105B as well as other connections among the five major components 101–105. Each of the five major components 101–105 are grounded to a common grounding bar 201. Further, each is energized by a common 5V source input 203. Note that the signal conditioning output 202 is provided as a filtered and regulated 5V input 202 to each of the four components 102–105 "downstream" of the signal conditioning circuit 101.

The entire system is provided necessary power for saving data in the memory 105 upon shut down, accidental or intentional, via capacitor 101C connected in parallel to the conditioned 5V input 202 that is fed to each component 102–105, resulting in a non-volatile memory 105. Capacitors 204 are provided at the input to each component to insure an orderly shutdown should the power supply fail or otherwise be disconnected prior to completion of an event and subsequent discharge of capacitor 101C.

The above descriptions should not be construed as limiting the scope of the invention but as mere illustrations of preferred embodiments. For example, although examples discussed data recorders at length, the method and apparatus is applicable to any electronic device that a user may need to operate in a hazardous environment, such as flight recorders onboard commercial aircraft. The scope shall be determined by appended claims as interpreted in light of the above specification.

We claim:

1. A method for recording data on a recorder that experiences physical shock, power disruption, or both, comprising:

conditioning a signal, said conditioning a signal comprising regulating voltage via a voltage regulator having an input and an output, providing a source of energy via a first capacitance and a second capacitance operably connected to said regulator's input and output, respectively, suppressing voltage spikes via a diode operably connected to said voltage regulator's output of said signal conditioning circuit and electrical ground, and providing one way isolation via a diode imposed between the input of said signal conditioning circuit and the power connection, wherein said signal-conditioning provides filtered and regulated power to said recorder;

powering components of a digital recorder using said conditioned signal;

establishing and providing a clock signal;

converting input analog signals into digital form as bytes of data;

separating said bytes into a most significant byte and a least significant byte;

controlling operations on said bytes using said clock signal and a trigger signal;

serially transmitting said separated bytes;

storing said separated bytes in non-volatile memory;

recombining said separated bytes; and outputting said recombined bytes, wherein said method provides a reliable and efficient means for acquiring, recording, and outputting data obtained while testing in unfavorable environmental conditions.

2. The method of claim 1, wherein said converting an analog input signal utilizes a 16-bit ADC to convert the analog input signal to a 16-bit word.

3. The method of claim 1, wherein said method utilizes a field programmable gate array (FPGA).

4. The method of claim 1, further comprising:

storing said data within said non-volatile memory consisting essentially of electronically erasable programmable read only memories (EEPROMs) and fast static random access memories (SRAMs), at least one of each of said EEPROMs and said SRAMs configured on each of a first and second memory chip, receiving input from said controller to said non-volatile memory in the form of two 8-bit bytes, a first 8-bit byte consisting of a most significant byte and a memory address, and a second 8-bit byte consisting of a least byte and a memory address, and reading said most significant byte into said first memory chip and said least significant byte into said second memory chip in the order of most significant byte first and least significant byte second.

5. The method of claim 1 further comprising:

providing fourth through ninth capacitors, each of said fourth through ninth capacitors imposed between an electrical ground and said signal conditioning circuit, said timing source, said analog-to-digital converter (ADC), said trigger, said controller, and said non-volatile memory, respectively, wherein said fourth through ninth capacitors provide for the orderly shutdown and power up of said recorder in the event of a power loss.

* * * * *